Oct. 16, 1962  R. W. ROUTSONG  3,058,466
BRIDGE DEVICES FOR SELF ADMINISTRATION OF EYE MEDICINE
Filed May 26, 1959  3 Sheets-Sheet 1

INVENTOR.
RICHARD W. ROUTSONG
BY Robert G. Danehower
ATTORNEY

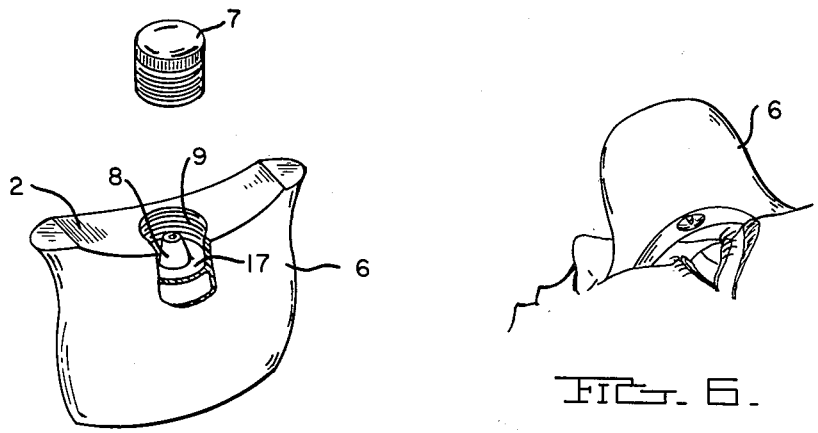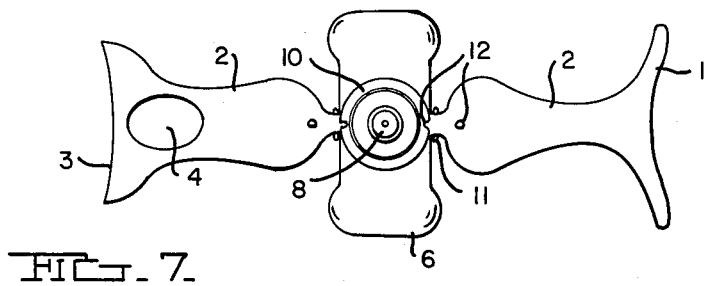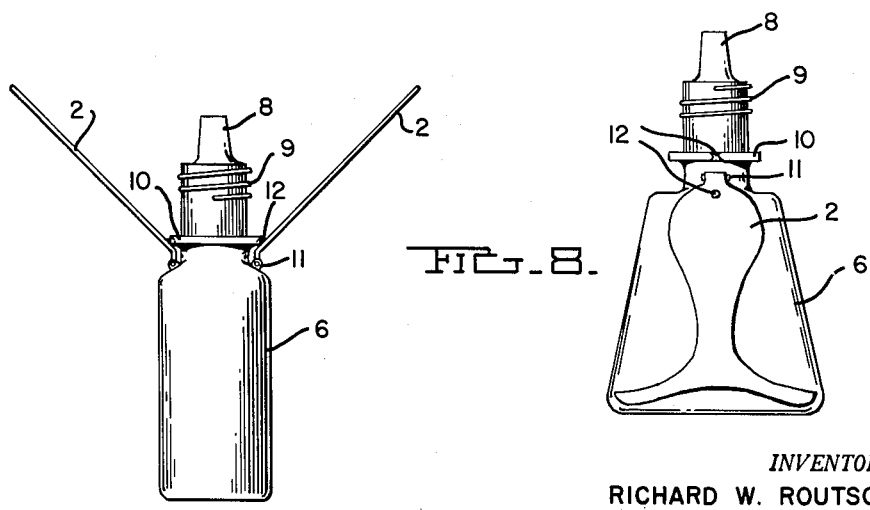

Oct. 16, 1962  R. W. ROUTSONG  3,058,466
BRIDGE DEVICES FOR SELF ADMINISTRATION OF EYE MEDICINE
Filed May 26, 1959  3 Sheets-Sheet 3

*INVENTOR.*
RICHARD W. ROUTSONG
BY
Robert G. Danehower

ATTORNEY

United States Patent Office 3,058,466
Patented Oct. 16, 1962

3,058,466
BRIDGE DEVICES FOR SELF ADMINISTRATION
OF EYE MEDICINE
Richard W. Routsong, Lansdale, Pa.
(111 Oakwood Drive, Largo, Fla.)
Filed May 26, 1959, Ser. No. 815,972
6 Claims. (Cl. 128—233)

This invention is directed to devices for supporting eye-drop administering means over the eye characterized by their having one or more bridge members to be placed on the face of the user.

The bridge is in the form of an arched member which may extend from the forehead to the cheek. The bridge member carries the eye-drop administering means such as an eye-dropping bottle and the arch of the bridge member spaces the tip of the drop administering means at a safe distance above the eye. The bridge member may also have means to enable the user's finger to distend the lower lid to act as a trap for the drops. Proper positioning of the bridge member on the face of the user guides the medicament from the dropping bottle into the user's eye when the head is tilted back.

The installation of eye medication in solution is a difficult task for most people due to the unnatural position of the head and arms at the moment of instillation of the eye drop and also due to the fact that depth perception is lacking during the process. This lack of depth perception may endanger the eye by a dropper accidentally hitting the eye ball. Moreover, the muscular tremor normally associated with unfamiliar positioning of the arms, coupled with the innate fear of any object held too close to the eye usually causes more of the medication to be deposited on the lids and cheek than is actually instilled in the eye. In many cases the patient does not receive the prescribed dosage and is wasting expensive medication.

The prior art devices which have sought a solution to the difficulties inherent in the self administration of eye medicine have, in general, been ineffective and have not found wide acceptance by the users of eye medicine. These devices have depended on the use of eye-dropping tubes with rubber squeeze bulbs positioned on members supported by nose bridges. In general, they have lacked the precision and convenience desired for satisfactory self instillation.

Accordingly, it is one of the objects of my invention to provide devices for the accurate, convenient, and safe administration of eye drops. It is also an object of my invention to provide a means for administering drops to one's eyes directly from a medicament bottle without the intervention of an eye-dropper tube. It is also an object of my invention to provide medicament dispensing means, particularly eye-dropper bottles in which one or more bridge members are an integral part of the dispensing means.

The present invention comprises a bridge which supports a medicine dropping bottle and positions it correctly over the user's eye at a safe elevation from the eye. An opening in the bridge permits the user's finger to engage the eyelid and distend it, thus providing a trap for the eye medicine.

In a variation of my invention, the bridge is attached to the medicine bottle itself for the user's convenience. In another variation of my invention, the bridge is an integral part of the eye-dropping bottle.

The invention will be further described in connection with the accompanying drawings. It is to be noted, however, that the exemplification of the drawings is by way of illustration only and is not intended to limit my invention in any manner except as set forth in the appended claims.

In the drawings:

FIGURE 1 is a view showing one form of the bridge of the present invention;

FIGURE 2 is another view of the bridge showing the bridge after it has been positioned on an eye-dropping bottle after removal of the bottle cap. The bridge with attached bottle is now in position to administer drops. FIGURE 2 also shows use of a finger to distend the lower eyelid. The bridge and guide with bottle attached has been applied to the face of the user with the user's head bent backwards in position to administer drops.

FIGURE 3 is a different form of my invention in which the bridge is adapted to provide a storage rack for the eye-dropping bottle when the bottle is not being used for administering drops. In this device the end of the bridge member which rests on the forehead also supports the base of the eye-dropping bottle when the bottle is being stored. The opening in the section of the bridge member which rests on the cheek serves the dual purpose of supporting the eye-dropping bottle adjacent the cap and also providing means for inserting a finger to depress the lower eyelid as shown in FIGURES 2 and 4. This form of the bridge is particularly adapted for storing and carrying of the eye-dropping bottle with the bridge.

FIGURE 5 shows another variation of my invention in which the bridge is formed by a concave surface of the dispensing container;

FIGURE 6 shows the same article in position for use on the face of the user;

FIGURE 7 is a variation of my invention containing bridge members pivotally attached to an eye-dropping bottle;

FIGURE 8 shows one of the pivotally attached bridge members hanging downwardly astride the container;

FIGURE 9 shows the same article of FIGURES 7 and 8 with the bridge members extended outward from the bottle and locked into extended position by friction means, ready for application to the user's face;

Figure 1:
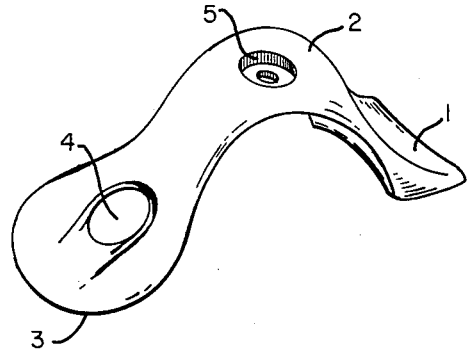
Figure 2:
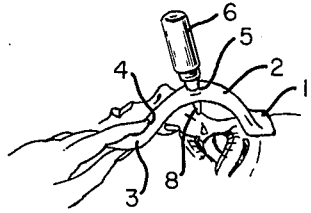

Referring to the drawings, the present invention in its simplest form comprises the bridge or bridging member 2 which may be arched or adapted in other ways to provide for the placing of eye drop administering means at a safe distance from the eye. The bridge member may be adapted to provide a bearing surface when placed on the forehead of the user as at 1 and on the cheek of the user as at 3. The bridge member may be formed by a concave surface of the medicament dispenser itself in the form of the invention illustrated in FIGURES 5 and 6. The bridge usually bears on two points of the person of the user, and on the face preferably at the forehead and cheek, or the bridge may bear on just one point and be supported by the user's fingers at the other end.

Figure 3:
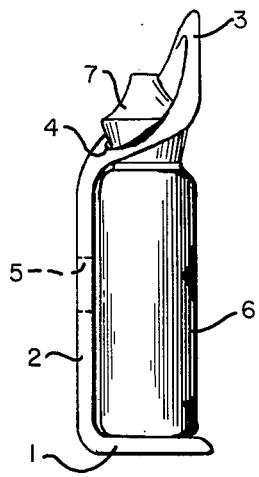
Figure 13:
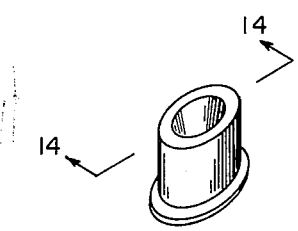
FIGURE 13 shows an adapter unit for the device of FIGURES 3 and 4 to accommodate an eye-dropper tube.
Figure 14:
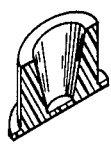
FIGURE 14 is a cross section of the adapter unit shown in FIGURE 13.

The bridge member 2 has an opening 4 to permit entry of a finger of the user to depress the lower eyelid or to accommodate the top of an eye-dropping bottle when in storage as shown in FIGURE 3. The bridge member also has an opening 5 for supporting eye drop administering means such as an eye-dropping bottle. The opening 5 in the bridge member may be threaded or it may merely provide a friction engagement of the eye drop administering means. Conveniently, the opening may be circular. The circular opening may be of smaller diameter on the side of the bridge member nearest the eye when the bridge and guide is in a position for use so as to engage the tip of an eye drop administering device, such as an eye-dropper tube or eye-dropper bottle having tapered tips. Conveniently, the opening 5 is circular and of uniform diameter through the bridge member as shown in FIGURE 3. The opening 5 may also receive an adapter unit as illustrated in FIGURES 13 and 14 to accommodate medicament dispensers having a different size tip, for example, an eye-dropper tube. The adapter unit conveniently may be circular with a central opening to accommodate an eye-dropper tube. Advantageously, the central opening may be tapered. The end of the adapter having the smaller diameter of the central opening may also be sealed so that it may also be used as a cap for the tip of an eye drop administering device.

The numeral 6 designates a medicament bottle such as an eye-dropper bottle. The bridge becomes an integral part of the medicament dispenser as shown in FIGURES 5, 6, 7, 8 and 9. Numeral 7 designates the cap of the dispensing bottle, while 8 designates the bottle dispensing tip. The numeral 9 designates threads on a dispensing bottle which may engage recessed threads in the opening in the bridge member 5. Alternatively, these threads may be omitted and friction engagement of the bottle with the opening in the bridge member is equally as satisfactory. The numeral 10 designates a ring member which carries friction means for engaging corresponding friction means on the pivotally attached bridge members 2 of FIGURES 7, 8 and 9 to hold them in extended position.

The bridge which is a single bridge in the form of my invention shown in FIGURES 1 through 6 becomes a multi-membered bridge pivotally connected in the species of my invention shown in FIGURES 7 through 12. Number 11 designates a pivoted connection for raising or lowering the bridge members 2 when they are pivotally attached to a medicament dispenser. The pivoted bridge members of FIGURES 7, 8 and 9 may be held in an extended position by friction means 12 which engage corresponding friction means on either side of the neck of the dispensing bottle. Again, these friction members are not necessary to my invention and any other means of holding the pivoted bridge members in extended position may be utilized.

Figure 10:
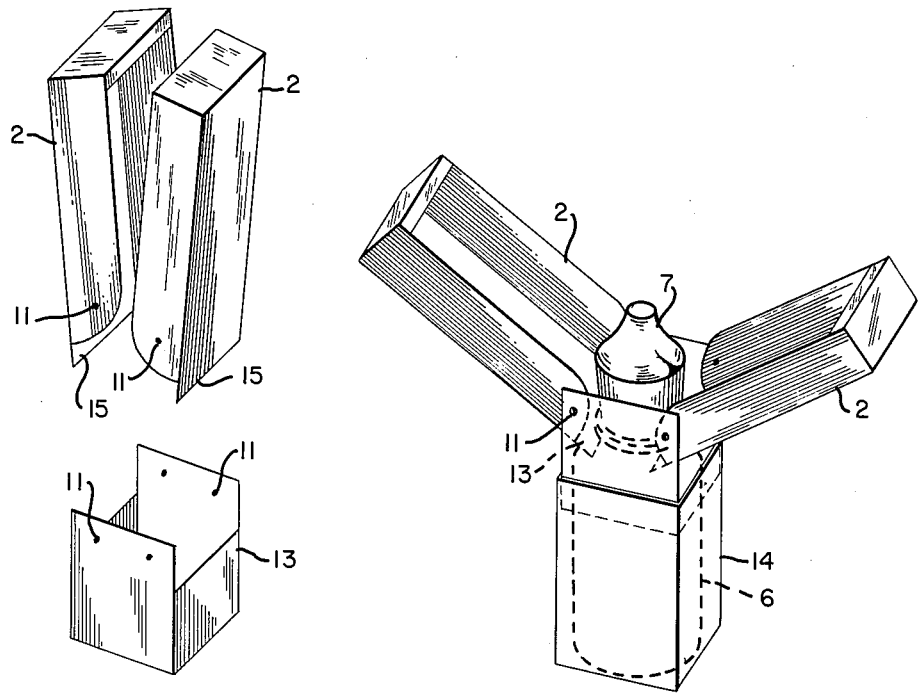
FIGURE 10 shows another variation of the invention in which pivoted bridge members are pivotally attached to a container for a liquid dispensing bottle. Here the bridge members are extended for positioning on the user ready for use.
Figure 11:
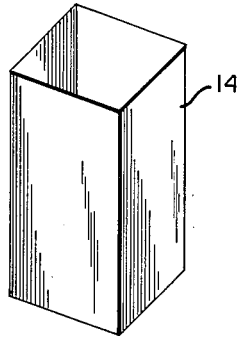
FIGURE 11 shows the same article as in FIGURE 10 in an exploded view showing pivoted members pivotally attached to an inner container member which telescopes in an outer container member shown directly underneath.
Figure 12:
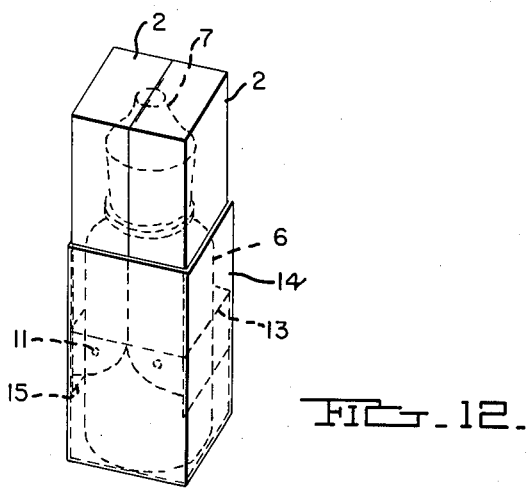
FIGURE 12 is a view of the same article in which a liquid dispensing bottle is enclosed by the bridge members in carrying position.

Numeral 13 designates an inner container member which acts as a support for the pivotally attached bridge members in the invention described in FIGURES 10, 11 and 12. The inner container member 13 is adapted to telescope inside of an outer container member 14 which holds the dispensing bottle. The outer container member 14 also supports the pivoted bridge members 2 in a closed position as shown in FIGURE 12 when in storage position. Numeral 15 designates an extension of the bridge memebrs adapted to engage the neck of the dispensing bottle when the bridge members are in an extended position as shown in FIGURE 10.

The novel bridge devices shown in FIGURES 1, 2, 3, and 4 may be made of plastic, wood, metal or other material capable of forming a bridge between two facial points spanning the eye and strong enough to support eye-drop administering means. This bridge properly positions the eye-dropper bottle over the eye and at the proper distance from the eye.

Figure 4:
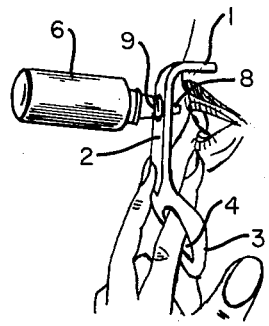
FIGURE 4 shows the bridge member of FIGURE 3 after the bottle has been removed from its storage position and has been inserted in the bridge member and applied to the face of the user preparatory to tilting the head back and instilling the eye drops.

In the variation of my bridge device shown in FIGURES 3 and 4, the bridge is adapted to also act as a storage rack for the eye-dropper bottle iself when not being used for administering drops thus providing a compact unit for storage or carrying.

A novel and important aspect of my bridge shown in FIGURES 1 through 4 is that provision is made for the insertion of one finger of the hand that is holding the bridge to the face to engage the lower eyelid of the eye to which drops are being installed and to distend it so that the eyelid may properly entrap the drops. This use of a finger while holding the bridge to the face of the user permits a much greater amount of the medicine to be utilized. Mroeover, it gives assurance to the user that the full prescribed dosage will be obtained in a safe and satisfactory manner.

FIGURES 5 and 6 show another variation of my invention in which the bridge member is formed by a concave upper surface of a medicament dispenser such as an eye-dropper bottle. Preferably, the concave surface is a longitudinally concave upper surface. The dispensing tip of the bottle is recessed so that it does not protrude into the arch formed by the bridge. The concavity produced by the bridge member when held against the person of the user permits the dropping of the medicament while, at the same time, avoiding contact between the tip of the dispensing container and the organ or member of the person of the user. This avoids possible contamination of the medicament and injury to the organ or member being treated such as the eye. The device is particularly useful for application to the face with the dispensing tip placed over the eye and, conveniently, the bridge may rest on the forehead and cheek.

This new device may be conveniently made of plastic so that the drops may be administered by pressing the bottle wall. Rigid materials, such as glass or metal may also be used.

It will also be apparent that the bridge device as shown in FIGURES 5 and 6 provide means for the instilling of eye drops by use of only one hand, for greater convenience and reduced demand of muscular coordination.

FIGURES 7, 8 and 9 show a variation of my invention in that the bridge and medicant dropping bottle are pivotally connected thus permitting the bridge members to be extended upwardly when the article is to be applied to the person of the user. Similarly, the bridge members may be lowered for compactness for storage purposes as shown in FIGURE 8. The bridge may be attached to the bottle by hinges or any other method pivotally securing them to the bottle. The ends of the bridge member may be contoured to fit the shape of the container and at the same time comfortably engage the person of the user, for example, the forehead and the cheek. The bridge members may be secured in the extended position by friction or other means, or the user may rely solely on holding them by the fingers in the extended position without the necessity of having auxiliary means.

These bridge members, which are attached to the bottle as shown in FIGURES 7, 8 and 9, may be conveniently made of plastic, metal, wood, cardboard and other materials.

In the variation of my invention shown in FIGURES 10, 11 and 12 the bridge member is part of a carrying device for a medicament dispensing container. Here the bridge members are pivotally attached to a carrying case member, thus forming an extension thereof. The carrying case member to which the bridge members are attached telescopes inside a second carrying case member. The medicament container may be supported by a base member as part of one of the container members. Alternatively, the medicament container may be supported by frictionally engaging the wall of the inner container.

It will be apparent to one skilled in the art that the bridge members may be pivotally attached to either of the two telescoping container members and that the other container member may be adapted to lock the bridge members in extended or in closed position. In this device the bridge and carrying case members may conveniently be made of plastic, wood, metal, cardboard and other materials.

This form of my invention is particularly useful in that the carrying case members pivot outwardly to bridge an organ or member of the user for dispensing medicaments, such as eye drops and pivot inwardly to form the top portion of a carrying case for the dispensing container when not in use. The bridge members are shown with an extension below the point of attachment which prevents the bridge members from being further extended. Other means will be apparent to lock the bridge members in position. This device is very useful as a carrying case for medicament dispensing bottles.

To use the bridge of FIGURE 1 to instill eye drops, the bottle cap is removed from the eye-dropper bottle and the bottle is placed on a table in an upright position. The bridge is forced down over the top of the bottle so that the tip of the bottle will protrude through the opening near the center of the bridge member. With palm up a finger is inserted through the large opening near the base of the bridge member. The bridge member is then pressed firmly against the face, preferably between the forehead and cheek, spanning the eye with the dispensing tip positioned over the eye. The finger inserted is pressed against the cheek immediately below the eye and the finger tip applies pressure to depress the lower lid. With the bridge member pressed firmly against the face the head is tilted back until a normal dropping position is assumed, that is, facing the ceiling. The free hand may be used to expel drops from a squeeze bottle or if the bottle is of the self-dropping type the head is tilted back until the metered number of drops have been dispensed from the bottle.

The term "eye drop administering means" has been used in the specification and claims to define any container suitable for dispensing eye drops such as a squeeze bottle, rigid bottle, or a dropper tube with attached rubber bulb. Similarly, the term "pivotally attached" defines any movable means of connecting two members.

While the devices of the present invention have been described by way of illustration and example for purposes of understanding, various changes may be made in the details of construction, or exchange of features of one form of the invention with another without departing from the spirit of the invention.

I claim:

1. A device for the self-administering of eye drops from an eye dropper bottle comprising an arch-shaped bridge member of the length required to span the distance between the bony structure of the forehead above the eyebrow and the bony structure of the cheek below the lower orbital margin, the opposite end portions of said bridge member being shaped to provide area contact between the bottom of said end portions and the forehead above the eyebrow and the cheek below the lower orbital margin respectively, so that the said end portions rest securely against the cheek and forehead during use while maintaining the said device entirely out of contact with the soft tissue of the upper and lower eyelids, said arch-shaped bridge member being open adjacent the central portion thereof for receiving the dispensing tip of an eye dropper bottle to permit the dispensing of eye drops through said bridge member while said bottle is supported by said bridge member over the eye.

2. A device for the self-administering of eye drops from an eye dropper bottle comprising a container for said eye drops having a concave surface at the dispensing end of the said container which provides an arch-shaped bridge member of the length required to span the distance between the bony structure of the forehead above the eyebrow and the bony structure of the cheek below the lower orbital margin, the opposite end portions of said bridge member being shaped to provide at least line contact between the bottom of said end portions and the forehead above the eyebrow and the cheek below the lower orbital margin respectively, so that the said end portions rest securely against the cheek and forehead during use while maintaining the said device entirely out of contact with the soft tissue of the upper and lower eyelids, said arch-shaped bridge member having a recess adjacent the central portion thereof for receiving an eye drop dispensing tip fastened within said recess to permit the dispensing of eye drops through said bridge member while said tip is supported by said bridge member over the eye.

3. A device for the self-administering of eye drops from an eye dropper bottle comprising a container for said eye drops having a concave surface at the dispensing end of the said container which provides an arch-shaped bridge member of the length required to span the distance between the bony structure of the forehead above the eyebrow and the bony structure of the cheek below the lower orbital margin, the opposite end portions of said bridge member being shaped to provide area contact between the bottom of said end portions and the forehead above the eyebrow and the cheek below the lower orbital margin respectively, so that the said end portions rest securely against the cheek and forehead during use while maintaining the said device entirely out of contact with the soft tissue of the upper and lower eyelids, said arch-shaped bridge member having a recess adjacent the central portion thereof for receiving an eyedrop dispensing tip fastened within the recess to the container to permit the dispensing of eye drops through said bridge member from said container while supported by said bridge member over the eye.

4. A device for the self administering of eye medicaments from an eye medicament dispensing container comprising an arch-shaped bridge member of the length required to span the distance between the bony structure of the forehead above the eyebrow and the bony structure of the cheek below the lower orbital margin, the opposite end portions of said bridge member being shaped to provide area contact between the bottom of said end portions and the forehead above the eyebrow and the cheek below the lower orbital margin respectively, so that the said end portions rest securely against the cheek and forehead during use while maintaining the said device entirely out of contact with the soft tissue of the upper and lower eyelids, said arch-shaped bridge member being open adjacent the central portion thereof for receiving the dispensing tip of an eye medicament dispensing container to permit the dispensing of eye medicaments through said bridge member while said container is supported by said bridge member over the eye.

5. A device for the self administering of eye medicaments from an eye medicament dispensing container comprising an arch-shaped bridge member of the length required to span the distance between the bony structure of the forehead above the eyebrow and the bony structure of the cheek below the lower orbital margin, the opposite end portions of said bridge member being shaped to provide area contact between the bottom of said end portions and the forehead above the eyebrow and the cheek below the lower orbital margin, respectively, so that the said end portions rest securely against the cheek and forehead during use while maintaining the said device entirely out of contact with the soft tissue of the upper and lower eyelids, said arch-shaped bridge member being open adjacent the central portion thereof for receiving the dispensing tip of an eye medicament dispensing container to permit the dispensing of eye medicaments through said bridge member while said container is supported by said bridge member over the eye, the said cheek supported end portion of said bridge member being provided with an opening to permit the insertion of a finger therethrough to depress the lower eyelid during the instilling of eye medicaments.

6. A combination device for the self administering of eye medicaments from an eye medicament dispensing container and for storage of the said container when not in use comprising an arch-shaped bridge member of the length required to span the distance between the bony structure of the forehead above the eyebrow and the bony structure of the cheek below the lower orbital margin, the said arch-shaped bridge member being open adjacent the central portion thereof for receiving the dispensing tip of an eye medicament dispensing container to permit the dispensing of eye medicaments through said bridge member while said eye medicament dispensing container is supported by the upper surface of said bridge member over the eye, the forehead end portion of said bridge member being shaped to provide at least line contact between the bottom of said end portion and the forehead above the eyebrow with the cheek supported end portion being shaped to provide area contact with the cheek below the lower orbital margin, so that the end portions rest securely against the cheek and forehead during use while maintaining said device entirely out of contact with the soft tissue of the upper and lower eyelids, the said forehead supported end portion also being adapted to support the base of said medicament dispensing container when not in use, the said cheek supported end portion of said bridge member being provided with an opening to permit the insertion of a finger therethrough to depress the lower eyelid during instilling of eye medicaments, said opening in the cheek supported end of said bridge member also being adapted to receive the dispensing end of said medicament dispensing container which extends therethrough and is supported thereby while said medicament dispensing container is in storage.

References Cited in the file of this patent

UNITED STATES PATENTS

| | | |
|---|---|---|
| 2,482,431 | Okawa | Sept. 20, 1949 |
| 2,676,592 | Wood | Apr. 27, 1954 |
| 2,722,216 | Robbins | Nov. 1, 1955 |
| 2,898,911 | Taylor | Aug. 11, 1959 |

FOREIGN PATENTS

| | | |
|---|---|---|
| 594,860 | Germany | Mar. 26, 1934 |
| 722,852 | France | Jan. 5, 1932 |